United States Patent Office 2,993,924
Patented July 25, 1961

2,993,924
ESTERS OF ANTIMONOUS ACIDS AND THEIR PENTAVALENT DERIVATIVES AND METHODS OF PREPARING SAME

Burton S. Marks and Blaine O. Schoepfle, Niagara Falls, N.Y., assignors to Hooker Chemical Corporation, a corporation of New York
No Drawing. Filed Oct. 4, 1957, Ser. No. 688,108
11 Claims. (Cl. 260—446)

This invention relates to esters of antimonous acid and their pentavalent derivatives and to methods of preparing same.

It is known that alcohols will react with antimony trichloride to yield the corresponding ester of antimonous acid. Also these esters may be produced by the reaction of metallic derivatives of alcohols with antimony trichloride. Furthermore, β-halo esters of antimonous acid may be synthesized by reacting the appropriate epoxide with antimony trichloride.

However, no general method reacting antimony trioxide with alcohols without the use of cumbersome dehydrating agents and techniques have been described for the preparation of these esters of antimonous acid.

Accordingly, it is an object of this application to describe the novel reaction conditions necessary for the preparation of these esters of antimonous acid, and their pentavalent derivatives. It is a further object to describe the necessary reaction conditions, including reactants and physical conditions which will make the preparation of such esters and their novel pentavalent derivatives feasible.

As further objects of the present invention are the production of esters of antimonous acid, and their pentavalent derivatives which are useful as flame-retarding additives. Illustrative of the flame retarding effectiveness of the esters of antimonous acid and derivatives thereof prepared in accordance with the teachings of this invention are many of the examples given in a separate application SN 688,111, filed of even date herewith. These examples show the use of said antimony compounds of this invention as flame retarding agents for various types of polymerizable polyester mixtures and also give comparative burning rate data of said mixtures with mixtures which do not employ the flame retardant antimony compounds of this invention.

A further object is the preparation of such esters which are capable of being partially or completely hydrolyzed and condensed with suitable materials to polymeric products suitable for use as film forming materials, impregnants, potective coatings and the like.

Further objects include the production of esters of antimonous acid useful in organic syntheses.

Still further objects and advantages of the present invention will appear from the more detailed description set forth below, it being understood that this more detailed description is given by way of illustration and explanation only, and not by way of limitation, since various changes therein may be made by those skilled in the art, without departing from the scope and spirit of the present invention.

In accordance with the present invention, it has been found that the reaction between alcohols and antimony trioxide may be carried out readily, leading to the progressive formation of alkyl, and aralkyl esters of antimonous acid; with conditions being controlled to determine the characteristics of the product obtained. The esters thus formed are readily prepared and obtained in substantial yields. The alcohol employed may be of the alkyl and aralkyl types. Among the alcohols which may be used, and which represent the foregoing types are: heptyl, octyl, nonyl, decyl, 2-ethylhexyl, undecyl, benzyl alcohols, etc. The corresponding antimony salts formed from reacting antimony trioxide with the previously listed alcohols are tris(n-heptyl) antimonite, tris(n-octyl) antimonite, tris(n-nonyl) antimonite, tris(n-decyl) antimonite, tris(2-ethylhexyl) antimonite, tris(undecyl) antimonite and tribenzyl antimonite.

While the invention has been referred to above by the reaction of individual alcohols with antimony trioxide, mixtures of alcohols may be employed if desired, but control of the process is best carried out as further illustrated below in the examples by the use of individual alcohols. The best controlled mixtures of alcohols used are those which have similar boiling points, e.g. n-octyl and 2-ethylhexyl alcohols.

The antimony reactant employed is antimony trioxide.
The reaction that takes place may be illustrated by that which takes place between antimony oxide and octyl alcohol.

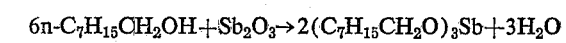

$$6n\text{-}C_7H_{15}CH_2OH + Sb_2O_3 \rightarrow 2(C_7H_{15}CH_2O)_3Sb + 3H_2O$$

The reaction probably occurs by the stepwise addition of the alcohol to the antimony trioxide, with loss of water until the equivalent of three moles of alcohol have been added per mole of antimony atom. The end of the reaction is signaled by no further evolution of water from the reaction mixture, and complies with the theoretical three moles of water.

In general the reaction is carried out by using a given molar quantity of antimony trioxide which is slurried in a large excess of the particular alcohol employed. This reaction mixture is heated to reflux and maintained thusly while water is split out, removed from the reaction, and collected in a suitable apparatus such as a Dean-Stark or Barrett water-trap. The end of the reaction is denoted by the elimination of the theoretical quantity of water and further by the fact that the reaction will not eliminate additional water on refluxing.

The process is best carried out by the use of excess alcohol as the solvent. However, other unreactive solvents which are of sufficiently high boiling point to allow reaction and its concurrent loss of water may be employed.

The alcohol used must be of sufficiently high boiling point to (1) allow the reaction to go smoothly with the theoretical loss of water, and (2) to remain within the confines of the reaction mixture if an additional solvent other than the alcohol is used. Furthermore, it is best that the alcohol be insoluble or non-miscible with water so that the reaction can be followed easily by noting the quantity of water eliminated.

The alcohols which are employed give the best results in general when their boiling points are in the range of 190° C. and higher. If the particular alcohol employed boils below 190° C., the reaction temperature will necessarily be below 190° C., and the reaction will be sluggish. In general the loss of water is usually noted by the time a reaction temperature of 190° C. is reached. The elimination of water is direct and simple, that is, no vacuum or drying agents are required for its removal. This is so because of the high boiling point reactants employed which permits relatively high reaction temperatures.

The product is obtained from the reaction mixture by the removal of the solvent and this is best accomplished by distillation. Because the solvents that are used are high boiling materials, they are best removed by distillation under reduced pressure, with care to keep the temperature of the product residue sufficiently low to avoid discoloration and decomposition. In order to obtain very high purity product, good purity starting alcohols are used and the reaction is maintained under a dry nitrogen blanket with careful temperature control in the purification step as outlined above. It should be pointed out that since the products are generally heavy viscous, non-distillable oils, which can hydrolyze even in the air, good samples for analysis are difficult to obtain.

As aforesaid, the products or esters of antimonous acid are in general easily hydrolyzed. The lower molecular weight alcohols give esters which in general are more easily hydrolyzed than those obtained from higher molecular weight alcohols.

As previously stated, this invention also has as one of its objects the preparation of the pentavalent derivatives of the esters of antimonous acid such as previously listed. Among such derivatives are tris(n-octoxy) antimony dibromide, tris(2-ethylhexoxy) antimony dibromide, tribenzoxy antimony dibromide, tris (β-chloropropoxy) antimony dibromide, tris (β-chlorobutoxy) antimony dibromide, etc.

These pentavalent derivatives are readily prepared by the addition of a stoichiometric quantity of bromine to the corresponding trivalent ester of antimonous acid. The reaction may be carried out in an inert solvent such as carbon tetrachloride or directly between the reactants without any extraneous solvent. The reaction goes readily in the initial stages and may slow up as the last few percent of bromine is added. The reaction can be followed by the dissipation of bromine color as the addition proceeds.

The following examples illustrate some of the products and processes of the present invention:

*Example 1.—Preparation of tris(n-octyl) antimonite* $(n-C_7H_{15}CH_2O)_3Sb$

A slurried mixture of 250 milliliters of n-octanol and 29.2 grams of antimony trioxide (0.1 mole) were heated together. At 190 degrees centigrade evolution of water was marked and water continued coming over as the temperature slowly rose. General refluxing was continued for 30 hours during which time water slowly was evolved from the reaction mixture, and collected in a Barrett water trap. The reaction mixture was allowed to cool and then filtered. The filtrate was subjected to vacuum distillation to remove the excess n-octanol. The residue, tris (n-octyl) antimonite was a water-white oil with a slight yellow-green tint. *Analysis.* — Calculated for $C_{24}H_{51}O_3$ Sb: Sb, 23.97; Found: 23.82.

*Example 2.—Preparation of tris(2-ethylhexyl) antimonite,* $(CH_3CH_2CH_2CH_2CH(C_2H_5)CH_2O)_3Sb$ A slurried reaction mixture of 29.2 grams (0.1 mole) of antimony trioxide and 250 milliliters of 2-ethylhexanol was heated to reflux, approximately 186 degrees centigrade. A slow evolution of water was noted. The reaction was allowed to reflux for 48 hours. After refluxing, the reaction mixture was filtered and the filtrate subjected to vacuum distillation to remove the excess 2-ethylhexanol. After distillation there remained 95 grams of residue, a slightly yellow tinted oil, tris(2-ethylhexyl) antimonite. *Analysis.*—Calculated for $C_{24}H_{51}O_3$ Sb: Sb, 23.97; Found: Sb, 23.77.

*Example 3.—Preparation of tribenzyl antimonite,* $(C_6H_5CH_2O)_3Sb$

In a 500 milliliter three-necked flask with nitrogen inlet tube, Barrett water trap, condenser, and thermometer was placed 250 milliliters of benzyl alcohol and 29.2 grams (0.1 mole) of antimony trioxide. This same equipment was also used in Examples 1 and 2. The reaction slurry was heated at reflux for varying times from ten to thirty-six hours, whereby most of the water was distilled over. The reaction mixture at the end of the reflux was found to be water-white oil. After filtration the oil was subjected to vacuum distillation to remove the excess benzyl alcohol. The residue, tribenzyl antimonite, was a water-white oil which seemed to yellow slightly on standing.

*Example 4.—Preparation of tris(n-octoxy) antimony dibromide,* $(n-C_7H_{15}CH_2O)_3SbBr_2$ To 20.4 grams of tris(n-octyl) antimonite (0.04 mole) was added slowly with stirring and cooling, 6.4 grams of bromine (0.04 mole). The bromine color was rapidly dissipated during the addition giving as a final product a heavy viscous yellow oil, tris(n-octoxy) antimony dibromide. *Analysis.*—Calculated for $C_{24}H_{51}O_3SbBr_2$: Sb, 18.25; Found: Sb 17.85.

*Example 5.—Preparation of tris(2-ethylhexoxy) antimony dibromide,* $(CH_3CH_2CH_2CH_2CH(C_2H_5)CH_2O)_3SbBr_2$ The reaction was carried out in a similar manner to Example 4 using instead antimony 2-ethylhexylate and bromine. A heavy viscous yellow oil, tris(2-ethylhexoxy) antimony dibromide was obtained. *Analysis.*—Calculated for $C_{24}H_{51}O_3SbBr_2$: Sb, 18.25; Found: Sb, 18.60.

*Example 6.—Preparation of tribenzoxy antimony dibromide,* $(C_6H_5CH_2O)_3SbBr_2$ To 22.15 grams of antimony benzylate (0.05 mole) was slowly added with stirring and cooling 8 grams of bromine (0.05 mole). The reaction was vigorous and exothermic, and about halfway through the addition the reaction mixture thickened perceptibly. Benzene was then added in order to reduce the viscosity and the remainder of the bromine was then added. The benzene was vaccuum distilled away to yield the dibromide adduct, tribenzoxy antimony dibromide, a heavy viscous, orange oil.

*Example 7.—Preparation of tris(β-chloroethoxy) antimony dibromide,* $(CH_2ClCH_2O)_3SbBr_2$ To 19 grams (0.053 mole) of tris(β-chloroethyl) antimonite was added 8.48 grams (0.053 mole) of bromine. A violent exothermic reaction occurs but with swirling the reaction moderated to yield a heavy viscous amber colored oil, the dibromo adduct, tris(β-chloroethoxy) antimony dibromide.

*Example 8.—Preparation of tris(β-chloropropoxy) antimony dibromide,* $(CH_3CH_2ClCH_2O)_3SbBr_2$ The dibromo adduct of tris(β-chlorpropyl) antimonite, tris(β-chloropropoxy) antimony dibromide was prepared in analogous fashion to tris(β-chloroethoxy) antimony dibromide in Example 7, and was similar in appearance and character.

*Example 9.—Preparation of tris(β-chlorobutoxy) antimony dibromide,* $(CH_3CH_2CH_2ClCH_2O)_3SbBr_2$ To 22.2 grams (0.05 mole) of tris(β-chlorobutyl) antimonite was added dropwise 8 grams (0.05 mole) of bromine, to yield the product tris(β-chlorobutoxy) antimony dibromide, an extremely heavy viscous deep yellow oil.

Having thus described our invention, what we claim and desire to secure by Letters Patent is:

1. A process for the preparation of pentavalent antimony compounds having the following structural formula:

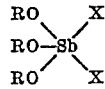

wherein Sb is pentavalent antimony and R is selected from the group consisting of alkyl radicals, substituted alkyl radicals, and aralkyl radicals and wherein X is a halogen selected from the group consisting of fluorine, chlorine, bromine and mixtures thereof, which comprises reacting an organic antimony compound having the formula:

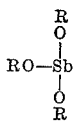

wherein Sb is trivalent antimony and wherein R is selected from the group consisting of alkyl radicals, substituted alkyl radicals, and aralkyl radicals; with a halogen selected from the group consisting of fluorine, chlorine, bromine, and mixtures thereof.

2. A process according to claim 1 wherein the halogen is bromine.

3. A composition of matter which has the formula:

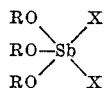

wherein Sb is pentavalent antimony and R is selected from the group consisting of alkyl radicals, substituted alkyl radicals; and aralkyl radicals and wherein X is a halogen selected from the group consisting of fluorine, chlorine, bromine and mixtures thereof.

4. A composition of matter according to claim 3 selected from the group consisting of tris(n-octoxy) antimony dibromide, tris(2-ethylhexoxy) antimony dibromide, tris(n-decoxy) antimony dibromide, tribenzoxy antimony dibromide, tris($\beta$-chloroethoxy) antimony dibromide, tris($\beta$-chloropropoxy) antimony dibromide, tris(2,3-dichloropropoxy) antimony dibromide and tris($\beta$-chlorobutoxy) antimony dibromide.

5. Tris(n-octoxy) antimony dibromide.
6. Tris(2-ethylhexoxy) antimony dibromide.
7. Tris($\beta$-chloropropoxy) antimony dibromide.
8. Tris($\beta$-chlorobutoxy) antimony dibromide.
9. Tris(2,3-dichloropropoxy) antimony dibromide.
10. Tris($\beta$-chloroethoxy) antimony dibromide.
11. Tribenzoxy antimony dibromide.

References Cited in the file of this patent
UNITED STATES PATENTS

| | | |
|---|---|---|
| 1,917,207 | Kaufmann | July 4, 1933 |
| 2,488,268 | Christiansen et al. | Nov. 15, 1949 |
| 2,511,013 | Rust et al. | June 13, 1950 |